US007051058B2

(12) United States Patent
Wagner et al.

(10) Patent No.: US 7,051,058 B2
(45) Date of Patent: May 23, 2006

(54) METHOD AND DEVICE FOR FILTERING A SIGNAL

(75) Inventors: Horst Wagner, Stuttgart (DE); Dirk Samuelsen, Ludwigsburg (DE); Ruediger Fehrmann, Leonberg (DE)

(73) Assignee: Robert Bosch GmbH, Stuttguart (DE)

( * ) Notice: Subject to any disclaimer, the term of this patent is extended or adjusted under 35 U.S.C. 154(b) by 230 days.

(21) Appl. No.: 10/276,502

(22) PCT Filed: May 3, 2001

(86) PCT No.: PCT/DE01/01685

§ 371 (c)(1),
(2), (4) Date: May 20, 2003

(87) PCT Pub. No.: WO01/88357

PCT Pub. Date: Nov. 22, 2001

(65) Prior Publication Data

US 2004/0254656 A1 Dec. 16, 2004

(30) Foreign Application Priority Data

May 17, 2000 (DE) ................................ 100 24 269

(51) Int. Cl.
*G06F 17/10* (2006.01)
*F02D 11/10* (2006.01)

(52) U.S. Cl. ........................ 708/300; 123/396; 123/399

(58) Field of Classification Search ................ 708/300; 123/396, 399

See application file for complete search history.

(56) References Cited

U.S. PATENT DOCUMENTS

| | | | | |
|---|---|---|---|---|
| 4,694,414 | A | 9/1987 | Christopher | |
| 4,918,707 | A * | 4/1990 | Yoshihara | 375/149 |
| 5,233,245 | A | 8/1993 | Romano et al. | |
| 5,775,293 | A | 7/1998 | Kresse | |
| 5,775,295 | A * | 7/1998 | Aubourg et al. | 123/399 |
| 5,838,599 | A * | 11/1998 | Tao et al. | 708/304 |

FOREIGN PATENT DOCUMENTS

| | | |
|---|---|---|
| DE | 37 38 719 | 7/1988 |
| DE | 41 08 734 | 9/1992 |
| DE | 195 34 633 | 12/1996 |
| DE | 197 22 253 | 11/1998 |
| DE | 197 53 996 | 6/1999 |
| DE | 198 14 743 | 10/1999 |
| EP | 0 319 973 | 6/1989 |
| RU | 2 042 859 | 8/1995 |
| RU | 2 104 407 | 2/1998 |
| SU | 1 061 702 | 7/1975 |

* cited by examiner

*Primary Examiner*—D. H. Malzahn
(74) *Attorney, Agent, or Firm*—Kenyon & Kenyon LLP

(57) ABSTRACT

A method and a device are described for filtering a variable. A first filtering arrangement is used for forming an output variable as a function of an input variable, the first filtering arrangement having at least a delaying effect. The input variable of the first filtering arrangement is corrected using a correcting variable which is obtained by starting from the input variable of the first filtering arrangement and by filtering, using a second filtering arrangement.

5 Claims, 2 Drawing Sheets

METHOD AND DEVICE FOR FILTERING A SIGNAL

FIELD OF THE INVENTION

The present invention relates to a method and a device for filtering a signal.

BACKGROUND INFORMATION

A method and a device for filtering a signal are referred to, for example, in the German Published Patent Application No. 195 37 787. A driver input amount may be filtered using a control signal-forming element. The filtering may be configured so that, for example, rapid driver input quantity changes (pedal force) may not act undamped on the fuel metering, and thus initiation of longitudinal vibrations of the vehicle may be avoided. Such filtering for the damping of the activation of systems may, in response to ramp-like changes in the input variable, generate a lag error. Therefore, the output variable may follow the input variable only at a delay. In an internal combustion engine application, for example, this may have the effect of a diminished drive torque.

SUMMARY OF THE INVENTION

According to an exemplary embodiment and/or exemplary method of the present invention, respective lag errors may be compensated for without limitations of the filtering effect having to be accepted, particularly in the case of stepwise changes in the input variable.

DETAILED DESCRIPTION

The present invention is described below, using the example of a fuel quantity signal in a self-igniting internal combustion engine. However, the present invention is not limited to this application. It may also be used in the case of other signals, such as, for example, in the case of signals which are used for the control of internal combustion engines. In particular, the exemplary method may be suitable for signals which influence or characterize the output torque. Such signals may be, for example, a fuel quantity signal, signals controlling power-influencing actuators, a quantity input signal, the output signal of an accelerator pedal sensor or a engine speed signal.

Figure 1:
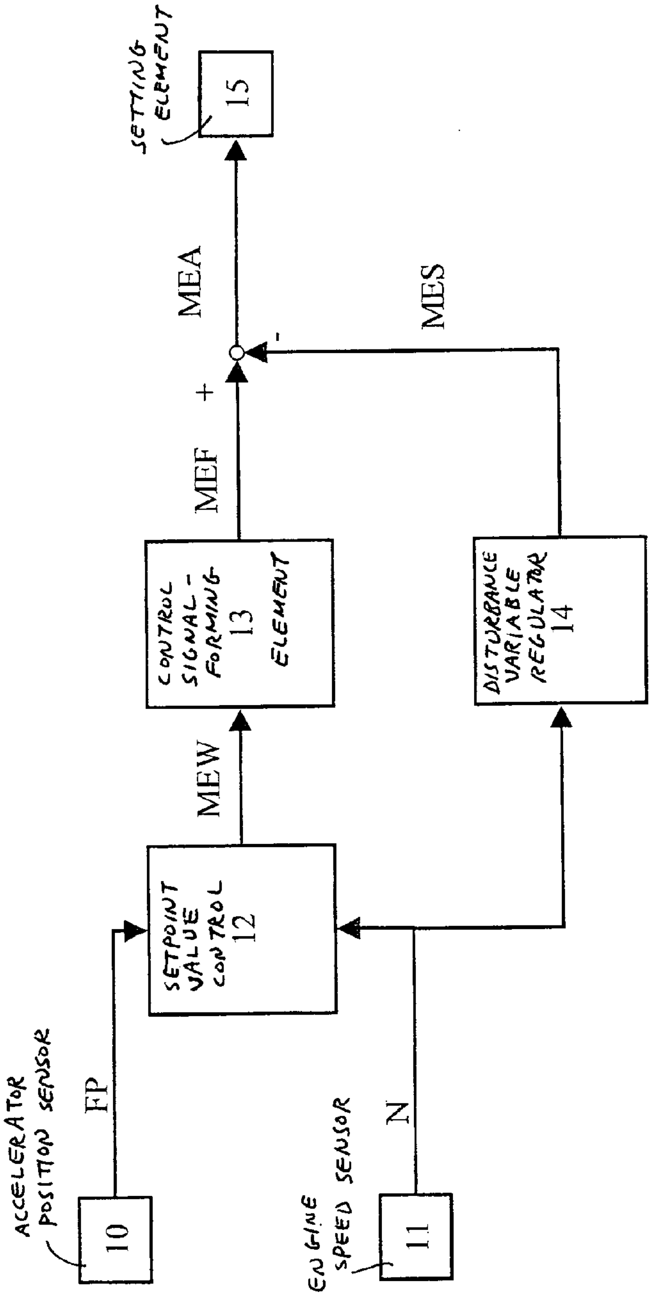
FIG. 1 shows a fundamental construction of a fuel metering system.

FIG. 1 shows a fundamental construction of a fuel metering system of an internal combustion system. Number 10 denotes an accelerator position sensor and 11 denotes a speed sensor. A setpoint value control 12 is connected to the accelerator-pedal position sensor and speed sensor 11. Output signal MEW of the setpoint control, which corresponds to the driver input quantity, goes to a control signal-forming element 13. Engine speed signal N of engine speed sensor 11 goes to a disturbance variable regulator 14. Output signal MEF of control signal-forming element 13 and output signal MES of disturbance variable regulator 14 are superimposed in a summing point, and form quantity signal MEA which is fed to a setting element 15. As a function of this signal MEA, a corresponding amount of fuel is metered to the internal combustion engine (not shown).

Starting from the accelerator position and the engine speed, setpoint value control 12 computes driver input quantity MEW which is required for making available the driving power input by the driver. In systems without anti-surge control, this signal is conducted directly to setting element 15. Setting element 15 converts this signal to a control signal for application to the corresponding actuators. Thus, for example, in the case of in-line fuel injection pumps, it may be provided that a setting regulating circuit adjusts the control rod positions to an appropriate value. In time-controlled systems, setting element 15 emits a control signal for a quantity-determining magnetic valve or a piezo actuator.

To compensate for judder vibrations when they occur, driver input signal MEW may be filtered using a control signal-forming element 13. Control signal-forming element 13 has a delaying effect. Thus, for example, filters having PT1 properties may be used. It may be desirable if, as control signal-forming element, filters are used which include further components.

Furthermore, engine speed signal N is conducted to a fault regulator 14. The new mode of operation of this device is discussed in German Published Patent Application No. 195 37 787.

If filter 13, which forms the control signal-forming element, has at least delaying behavior, such as a T1 element, a lag error may appear in response to certain changes in the input variable of filter 13. Therefore, the output variable follows the input variable only at a delay.

According to an exemplary embodiment and/or exemplary method of the present invention, this lag error may be rectified by applying to the input of the filter a correction value formed from the input variable. For example, for this purpose, the input variable may be derived with respect to time, i.e. differentiated, and subsequently weighted with a predefinable value. This weighting factor may be predefined as a function of the response characteristic of the filter to be corrected. In this context, the derivation with respect to time of the input variable is limited, in order to maintain the filtering effect, in response to the rapidly changing input variable, in spite of the measures against lag errors.

Figure 2:
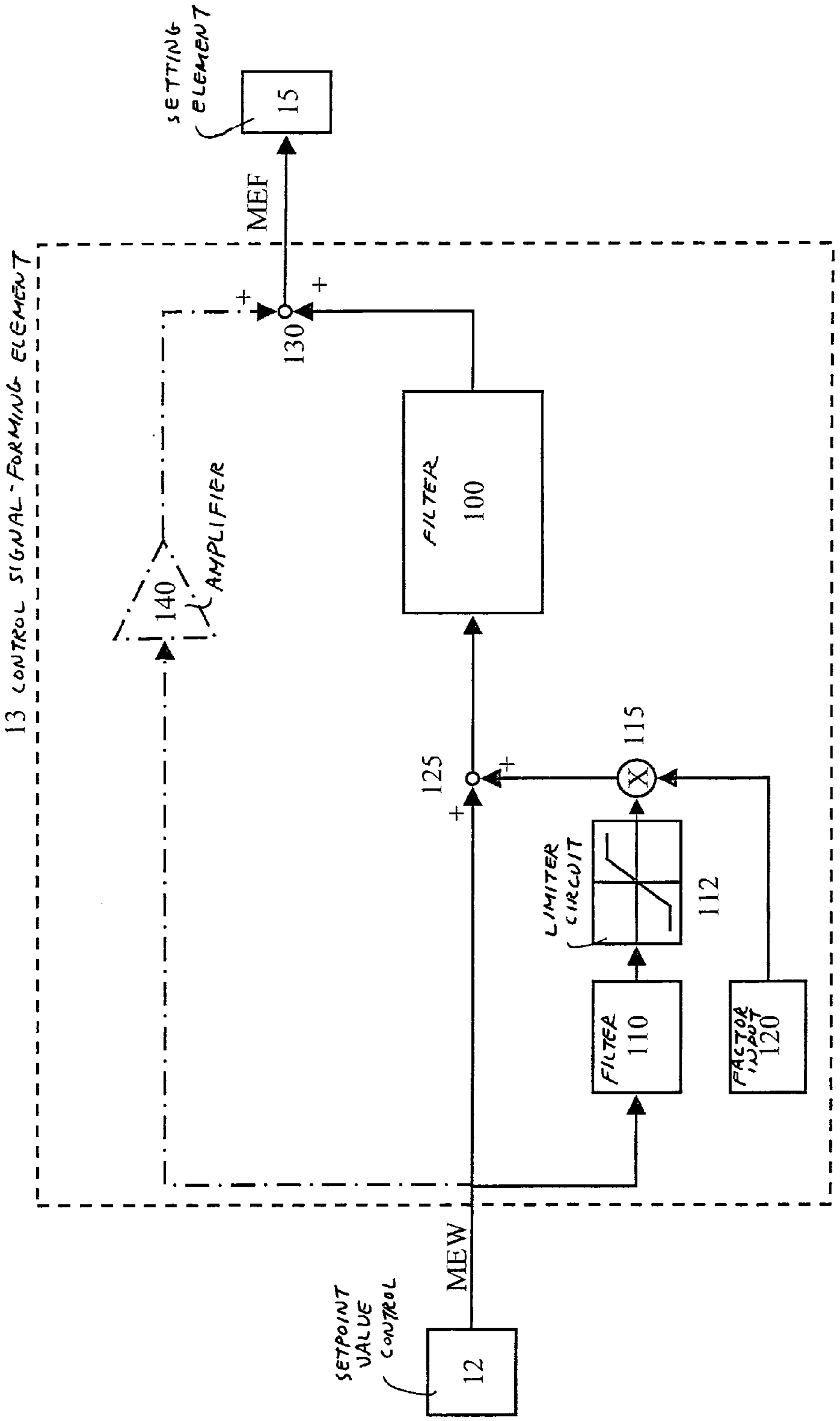
FIG. 2 shows a block diagram of an exemplary method according to the present invention.

In FIG. 2 the control signal-forming element having such a correction is shown in greater detail. Elements which have already been described in FIG. 1 are denoted by corresponding reference symbols.

The actual filter of the control signal-forming element is denoted as first filter 100. Input variable MEW of control signal-forming element 13, on the one hand, having a positive sign, reaches a linkage point 125, and on the other hand, it reaches a second filter 110. The output signal of linkage point 125 reaches first filter 100.

The output signal of second filter 110, via a limiter circuit, reaches a second linkage point 115. The output signal of linkage point 115, having a positive sign, reaches linkage point 125. The output signal of a factor input 120 forms the second input of second linkage point 115. The output signal of first filter 100 forms the output variable MEF.

In one exemplary embodiment it may also be provided that limiter circuit 112 is positioned after linkage point 115. This means that limiter circuit 112 limits the correcting variable by which the input variable of first filter 100 is corrected in linkage point 125.

A further exemplary embodiment according to the present invention is shown by dots and dashes. Here, the input variable, via an amplifier 140, additionally reaches a linkage point 130, at whose second input the output variable of first filter 100 is present. Then, these two linked variables form output variable MEF.

Second filter 110 may be configured as a differentiator. Second filter 110 includes at least one differentiating component. For example, the second filter may also have a PD element or be configured as a DT element. The output variable of second filter 110 is limited by limiter circuit 112 to the highest admissible values, in absolute value terms, so as to ensure the filter effect in response to a rapid, and, for example, stepwise change of input variable MEW.

Limiter circuit 112 is dimensioned so that the limitation in response to a slowly changing input value is ineffective, and filter 110 delivers an uninfluenced contribution to the correction of the input variable of first filter 100. In response to slow changes of the input variable, second filter 120 has a relatively large influence on the filtered variable. According to an exemplary embodiment and/or exemplary method the present invention, this may prevent the lag errors. In the case of stepwise, that is, rapid changes of the input variable, the limitation may be effective, whereby the corresponding contribution of second filter 110 to the correction of the input variable of the first filter is only small. In response to slow changes of the input variable, second filter 120 has a relatively small influence on the filtered variable. In this case, first filter 100 may have a great influence on the filtered variable.

In linkage point 115, the output signal of second filter 110 is weighted with a preset weighting factor from factor input 120. The weighting factor is to be preset as a function of the response characteristic of first filter 100.

In one exemplary embodiment, first filter 100 has the response function $$K/(T^*s+1)$$

Here the value T is denoted as the time delay constant and the value K as the proportional gain.

The factor of factor input 120 may be identical to time constant T. This means that the output signal of second filter 110, limited by limiter circuit 112, is weighted with the factor of factor input 120, i.e. with time delay constant T of first filter 100.

In a second exemplary configuration, amplifier 140 has a gain V. The proportional gain K of the first filter then takes on the value K=1−V.

According to an exemplary embodiment and/or exemplary method of the present invention, input variable MEW of first filter 100 is corrected as a function of a correcting variable. This means that, starting from input variable MEW of the first filter, the correcting variable for the correction of this input variable is determined. In one exemplary embodiment, the input variable is derived with respect to time or differentiated, and is thereafter weighted with a factor. In this context, the factor may be determined by the response characteristic of the first filter. The factor corresponds to the time delay constant T of the first filter.

A part of the signal may be corrected. This may be implemented in that the proportional gain K of the first filter is selected as less than 1, and a correspondingly amplified input signal is fed to the output signal of the first filter.

What is claimed is:

1. A device for filtering a variable, comprising:

a first filtering arrangement for forming a first output variable as a function of an input variable and a correcting variable which are fed to at least the first filtering arrangement, the first filtering arrangement having a delaying effect; and a second filtering arrangement for receiving the input variable and generating an intermediate output variable by filtering the input variable, wherein the correcting variable is generated by the second filtering arrangement by weighting the intermediate output variable with a predetermined weighting factor.

2. The device of claim 1, wherein the second filtering arrangement includes a differentiating property.

3. The device of claim 1, wherein the intermediate output variable of the second filtering arrangement is limited by a limiter unit of the second filtering arrangement.

4. The device of claim 1, wherein the weighting factor is determined as a function of a response characteristic of the first filtering arrangement.

5. A method for filtering a variable, comprising:

generating a first output variable using a first filtering arrangement, as a function of an input variable and a correcting variable which are fed to at least the first filtering arrangement, wherein the first filtering arrangement has a delaying effect;

generating an intermediate output variable using a second filtering arrangement, wherein the second filtering arrangement receives the input variable and generates the intermediate output variable by filtering the input variable; and generating the correcting variable using the second filtering arrangement, by weighting the intermediate output variable with a predetermined weighting factor.

* * * * *